(12) United States Patent
Goodman

(10) Patent No.: US 8,494,276 B2
(45) Date of Patent: Jul. 23, 2013

(54) TACTILE INPUT RECOGNITION USING BEST FIT MATCH

(75) Inventor: Brian D. Goodman, West Redding, CT (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 13/243,201

(22) Filed: Sep. 23, 2011

(65) Prior Publication Data
US 2013/0077865 A1    Mar. 28, 2013

(51) Int. Cl.
*G06K 9/00* (2006.01)
(52) U.S. Cl.
USPC ............................ 382/187; 382/188; 382/189
(58) Field of Classification Search
USPC .......................................... 382/181, 187, 231
See application file for complete search history.

(56) References Cited

U.S. PATENT DOCUMENTS

| | | | |
|---|---|---|---|
| 7,337,400 | B1 | 2/2008 | Elbing et al. |
| 2003/0071853 | A1 | 4/2003 | Hafner et al. |
| 2008/0028304 | A1 | 1/2008 | Levantovsky et al. |
| 2010/0044121 | A1 | 2/2010 | Simon et al. |
| 2010/0231598 | A1 | 9/2010 | Hermandez et al. |
| 2010/0275161 | A1 | 10/2010 | Dicamillo et al. |
| 2010/0290711 | A1 | 11/2010 | Gurcan et al. |
| 2011/0044547 | A1 | 2/2011 | King et al. |

FOREIGN PATENT DOCUMENTS

| | | |
|---|---|---|
| EP | 0992006 B1 | 8/2002 |
| WO | WO 00/67247 A1 | 4/2000 |

OTHER PUBLICATIONS

Ribarsky et al.; "Glyphmaker: Creating Customized Visualizations of Complex Data", Georgia Institute of Technology, vol. 27, Issue 7, Jul. 1994, pp. 57-64.
Sawant et al.; "DiffArchViz: A Tool to Visualize Correspondence Between Multiple Representations of A Software Architecture", Inter. Work. on, Jun. 24-25, 2007, pp. 121-128.
Osawa, Noritaka; "Tactile Glyphs for Palpation of Relationships", 10th International Conference on, Jul. 5-7, 2006, pp. 575-583.
Jung et al.; "Effect of Tactile Display in Visually Guiding Input Device", IEEE/RSJ International Conference on, Oct. 9-15, 2006, pp. 5046-5051.

*Primary Examiner* — Edward Park
(74) *Attorney, Agent, or Firm* — Cahn & Samuels, LLP

(57) ABSTRACT

An embodiment of the invention provides a method including receiving input from a user, which includes a handwritten symbol. The input is compared to prototype symbols to determine whether the input includes a threshold degree of similarity with a prototype symbol. If the input does not include a threshold degree of similarity with a prototype symbol, the input is stored as a prototype symbol. If the input includes a threshold degree of similarity with a prototype symbol, it is determined whether the input represents a text character. If the input represents a text character, the text character is identified and a prototype text character is identified. The input is mapped to the identified text character and the identified prototype text character. If the input does not represent a text character, the input is mapped to a prototype shape, and the input is mapped to the prototype shape.

25 Claims, 4 Drawing Sheets

US 8,494,276 B2

TACTILE INPUT RECOGNITION USING BEST FIT MATCH

BACKGROUND

The present invention is in the field of systems, methods, and computer program products for enhancing tactile input recognition using best fit match.

Handwriting recognition as a result of tactile input decoding transforms an individual's penmanship into fonts. Graphic applications average points of a gesture to smooth the connecting line. With the increasing number of stylus and touch based input systems (e.g., touch screen telephones and computer tablets), increasing the bandwidth between a human and a device involves direct interaction with a virtual canvas.

SUMMARY OF THE INVENTION

An embodiment of the invention provides a system and method for enhancing tactile input recognition using best fit match. More specifically, the system includes an interface for receiving input from a user, wherein the input includes at least one handwritten symbol. A database including prototype symbols is connected to the interface. A symbol processor connected to the database compares the input to the prototype symbols stored in a database to determine whether the input includes a threshold degree of similarity with at least one of the prototype symbols. If the input does not include a threshold degree of similarity with at least one of the prototype symbols, the input is stored as a prototype symbol. If the input includes a threshold degree of similarity with at least one of the prototype symbols, the symbol processor determines whether the input represents a text character.

If the input represents a text character, a text processor connected to the symbol processor identifies the text character and identifies at least one prototype text character in the database based on the identified text character. The text processor maps the input to the identified text character and the identified prototype text character, and displays the input, the identified text character, and the identified prototype text character on the interface.

If the input does not represent a text character, a shape processor connected to the symbol processor matches the input to at least one prototype shape in the database, and identifies a standard shape represented by the input. The shape processor maps the input to the prototype shape and the standard shape, and displays the input, the prototype shape, and the standard shape on the interface.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention includes a system that addresses the gap where tactile input is recognized and faced with the dichotomy of either being characters or pixels. The system recognizes tactile input, matches it to other markings (also referred to herein as "glyphs" or "symbols") the user has inputted in the past, and displays the best-fit version to the user.

An embodiment of the invention provides a method for mapping tactile input recognition to a "best fit" prototypical input. This capability enables systems to consistently display character markings (e.g., letters) in the user's best form. The method also enables systems to understand input in terms of intended form even if the character markings are rendered in pixels. Thus, systems are able to understand both the present input and the user's best input from previous entries, thereby preserving the flourish of the present input but mapping it to a prototypical version. The method intercepts tactile input and learns the best version of the input. The input is also matched to future input and the best version is transmitted as the output. The present input plus the best version can be added to the input model.

At least one embodiment utilizes a tablet-based platform capable of handwriting recognition, wherein the recognition identifies the marking and maps it to the best versions of that marking input in the past. The result is the user's best handwriting with limited regard to potentially error prone input. Another embodiment utilizes a touch sensitive device where tactile input is received and matched to the best versions of that marking that was input in the past, wherein the input is modified and passed on or along with the initial input. Thus in at least one embodiment, applications do not need to understand the "best" versions of input; instead, they only need the received input and the best version of the input.

Figure 1:
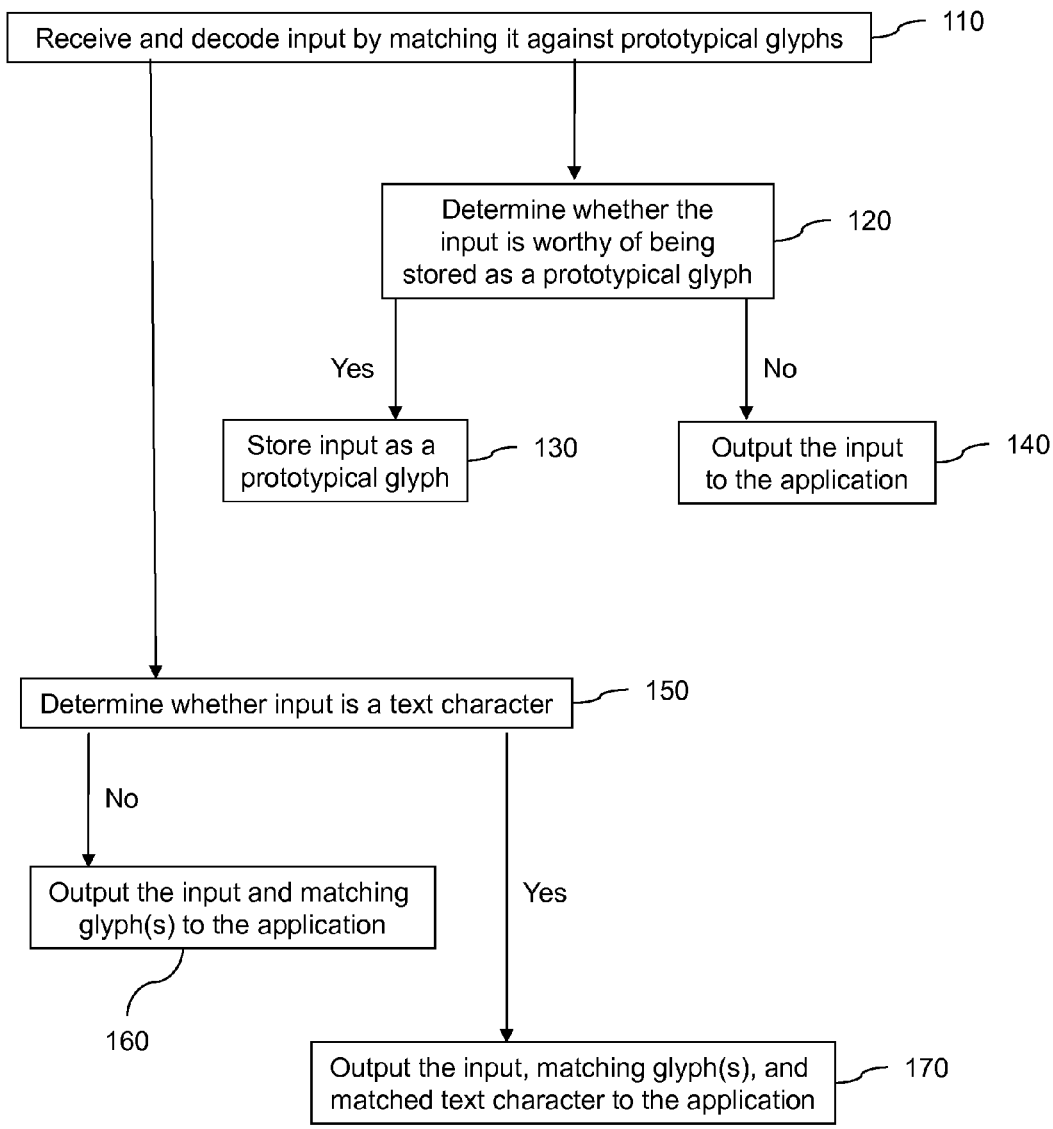
FIG. 1 is a flow diagram illustrating method for enhancing tactile input recognition according to an embodiment of the invention.

FIG. 1 is a flow diagram illustrating a method for enhancing tactile input recognition according to an embodiment of the invention. A device receives input and decodes the input by matching it against prototypical glyphs stored in an internal or external database 110. In other words, the input is compared to characters and shapes in a database to look for a match. As used herein, the term "glyph" includes one or more strokes made by a human using a stylus or a finger.

The input is evaluated to determine whether it is worthy of being stored as a prototypical glyph 120. More specifically, the input is analyzed to determine whether it is close enough (i.e., within a predetermined degree of similarity) to a character or shape in the database. Typically, input analysis systems leverage handwriting and/or image detection approaches. For instance, input can be mapped to a graph that is then compared to other graphs. Graphs can be filtered by capturing the percent coverage, wherein the amount of the mark covering the graph is used to optimize the search for similar glyphs. Moreover, graphs can be further decomposed into quadrants to optimize search and retrieval. In addition, other methods exist for character and shape recognition. If the input is within a predetermined degree of similarity to a character or shape in the database, then it is worthy of being stored as a prototypical glyph.

If the input is worthy of being stored as a prototypical glyph, then the input is stored in the database 130. If a glyph already exists in the database, then the glyph is replaced with the new input, multiple representations of the glyphs are stored, and/or all of the glyphs representing the same character or symbol are averaged. For example, if the input is the letter "A" and the database has 3 other representations of the letter "A", then the 4 different representations of the letter "A" are averaged and stored. If the input is not worthy of being stored as a prototypical glyph (i.e., not within a predetermined level of similarity to glyphs in the database), then the received input is output (e.g., as an image and/or text character) to the application 140 (e.g., word processor, web browser, e-mail client).

The input is examined to determine whether it is a text character (i.e., letter, number, or punctuation) 150. If the input is not a text character (e.g., a shape such as a triangle), then the input and any matching glyph stored in the database is output to the application 160. If the input is a text character, then the input, any matching glyph stored in the database, and the matched text character (e.g., an indication that the input is matched to the letter "B") is output to the application 170.

Figure 2:
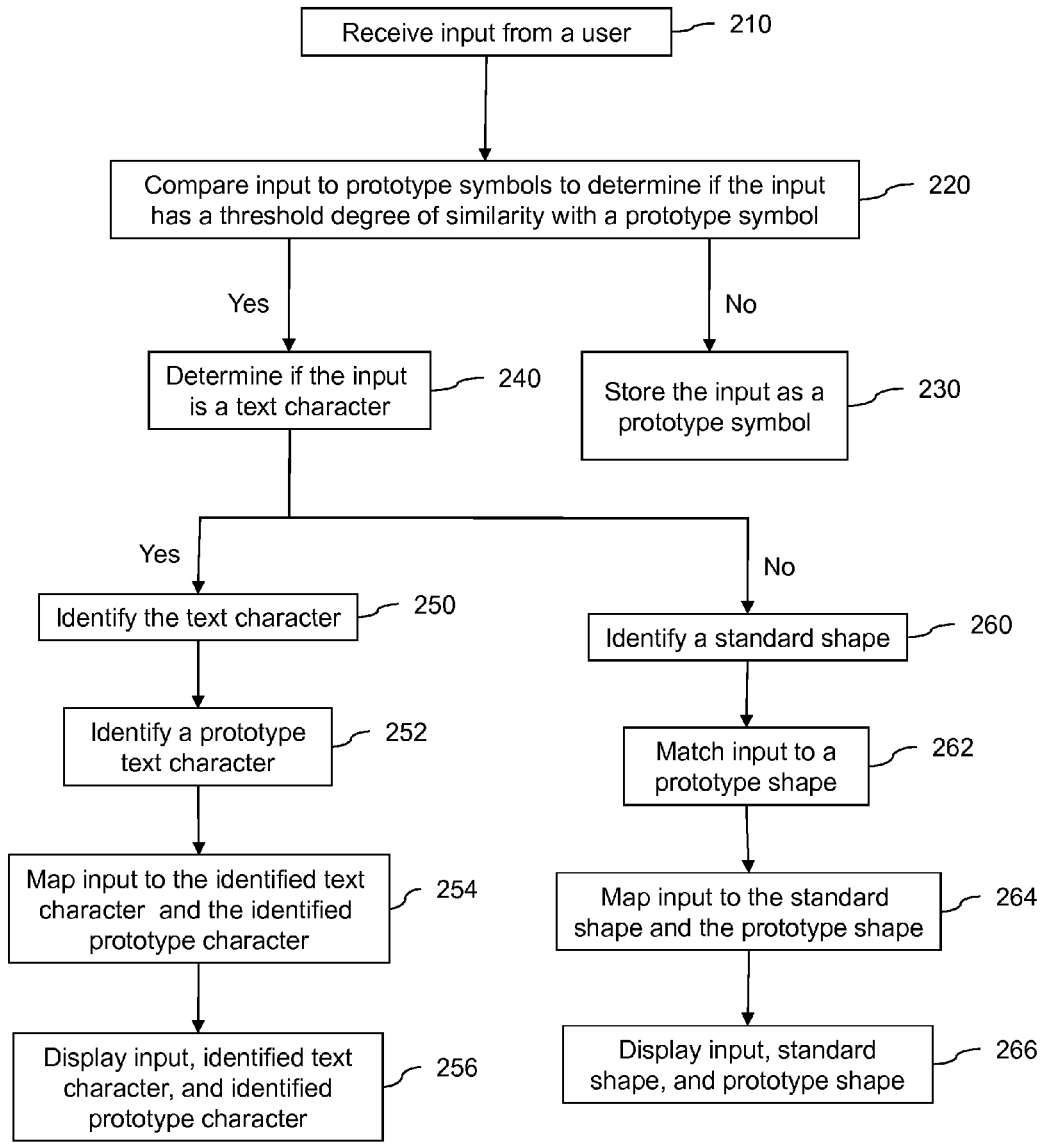
FIG. 2 illustrates a method for handwriting recognition according to an embodiment of the invention.

FIG. 2 illustrates a method for handwriting recognition on an electronic device according to an embodiment of the invention. Input is received from a user on an interface of the electronic device 210, wherein the input including at least one handwritten symbol. For example, the user writes an upper case letter "B" on a computer tablet screen using a stylus. The input is compared to prototype symbols stored in a database to determine whether the input has a threshold degree of similarity with one or more of the prototype symbols 220.

In at least one embodiment, the term "prototype" includes a handwritten symbol that represents the best version of a text character or shape that the user has input in the past on the electronic device or a similar electronic device. For example, a prototype of the letter "G" is a marking that the user has input in the past that most closely resembles the typewritten form of the letter "G" (i.e., a previous input that has the least number of errors in handwritten curves, lines, angles, etc. (e.g., missing or skewed lines)). The electronic device includes an internal database and/or includes a wireless communication module for connecting to an external database.

If the input does not include a threshold degree of similarity with at least one of the prototype symbols, the input is stored as a prototype symbol 230. For example, if the "B" input by the user is not matched to (i.e., not similar to) any of the prototype symbols in the database, then it is possible that the user has never input the letter "B" in the past; and as such, the "B" input by the user is stored in the database.

In at least one embodiment of the invention, the input is stored as a new prototype text character or a new prototype shape. In one embodiment, an old prototype text character or shape is replaced with the new prototype text character or shape. In another embodiment, the input is averaged with the prototype text character(s) or shape(s) to create an averaged prototype text character or shape. Future input from the user is compared to the new prototype text character or shape.

If the input includes a threshold degree of similarity with at least one of the prototype symbols, then it is determined whether the input represents a text character 240. In at least one embodiment, the term "text character" includes letters, numbers, and punctuation. If the input represents a text character, the text character is identified 250 and one or more prototype text characters in the database are identified based on the identified text character 252. In another example, the electronic device determines that the "B" input by the user represents the text character "B". Based on this, one or more prototype text characters saved under the letter "B" are identified in the database. In at least one embodiment, at least one prototype text character is stored for each text character in the database, wherein the prototype text character has a threshold degree of similarity with the text character.

The input is mapped to the identified text character and the identified prototype text character 254. For example, the handwritten "B" input by the user is mapped to the text character "B" and at least one prototype letter "B". Unlike the identified text character (e.g., typewritten form of the letter "B"), the prototype text character is a handwritten marking that was previously input by the user. In at least one embodiment, the term "mapping" includes linking, correlating, associating, appending, and/or tagging.

The handwritten input, the identified text character, and the identified prototype text character are displayed on the interface 256. In at least one embodiment, the handwritten input, the identified text character, and the identified prototype text character are output to an application (e.g., an e-mail client). Having both the best glyph (i.e., the identified prototype text character) and the character (i.e., the identified text character) supports systems that do not use glyph technology, i.e., technologies that are only looking for the character. The input object is a container of the keystroke, the x, y location of a mouse click, etc. By adding to the object, all applications seamlessly work with the additional information, even if they are not using it. In other words, event driven programming environments typically have the operating system manage key presses, mouse movement, button presses and pen/tablet input. In order to pass these inputs and events to applications running in the operating environment, the operating system packages the relevant information into an object or data structure representing the event and any relevant details. An embodiment of the invention adds information to this object to enable applications that already understand character input continued function. If the input glyph is determined to be a character, then the best glyph and the character it represents is added to the input object. In this way, existing applications are able to continue to function without the requirement of understanding the best glyph. In addition, having both the best glyph and the character satisfies systems that want the option of having the best glyph, although they may use the character to make sense of the content. For example, such systems would more easily be able to search the glyphs for content entered with characters.

If the input does not represent a text character, a standard shape represented by the input is identified 260. In at least one embodiment, the term "shape" includes an object that is not a text character (e.g., checkmark, arrow, smiley face). The input is matched to at least one prototype shape in the database based on the identified standard shape 262. For example, the user draws a checkmark on the interface, the electronic device identifies the drawing as a checkmark, and at least one prototype checkmark is identified in the database (i.e., a checkmark that the user has drawn in the past). In at least one embodiment, at least one prototype shape is stored for each shape in the database, wherein the prototype shape has a threshold degree of similarity with the standard shape.

The input is mapped to the standard shape and the prototype shape 264. Unlike the standard shape, the prototype shape was previously input/drawn by the user. The input, the standard shape, and the prototype shape are displayed and on the interface 266. In another embodiment, the input, the standard shape, and the prototype shape are output to an application (e.g., word processor).

Figure 3:
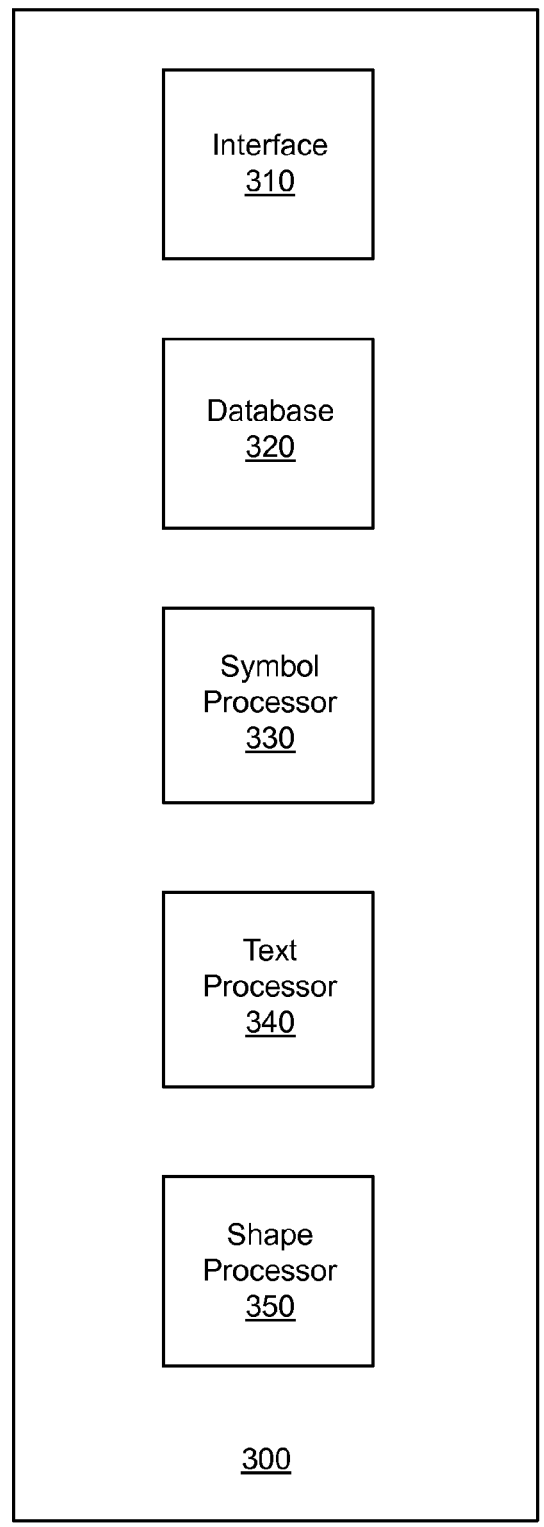
FIG. 3 illustrates a system for handwriting recognition according to an embodiment of the invention.

FIG. 3 illustrates a system 300 for handwriting recognition according to an embodiment of the invention. The system 300 includes an interface 310 for receiving input from a user, wherein the input includes at least one handwritten symbol (e.g., from a stylus). A database 320 is connected (define) to the interface 310, wherein the database 320 includes prototype symbols. As used herein, the term "connected" includes operationally connected, logically connected, in communication with, physically connected, engaged, coupled, contacts, linked, affixed, and attached. As described above, the term "prototype" includes a handwritten symbol that represents the best version of a text character or shape that the user has input in the past on the system 300 or other electronic device.

A symbol processor 330 is connected to the database 320, wherein the symbol processor 330 compares the input to the prototype symbols stored in the database 320 to determine whether the input includes a threshold degree of similarity with a prototype symbol. For example, the user draws the letter "Z" on the interface 310, and the database 320 is queried to determine whether the drawing matches a prototype "Z" drawn by the user in the past. The symbol processor 330 also determines whether the input is a text character (i.e., letter, number, or punctuation).

A text processor 340 is connected to the symbol processor 330, wherein the text processor 340 identifies the text character, if the input represents a text character, and identifies one or more prototype text characters in the database based on the identified text character. For example, the text processor 340 identifies the user's marking as the text character "Z" (e.g., typewritten form of the letter "Z") and identifies a prototype text character "Z" that the user has drawn in the past.

In at least one embodiment, the text processor 340 stores at least one prototype text character for each text character in the database 320, wherein the prototype text character includes a threshold degree of similarity with the text character. Thus, in one embodiment, the text processor 340 stores the input as a new prototype text character. In another embodiment, the text processor 340 averages the input with the prototype text character(s) to create an averaged prototype text character. The text processor 340 compares future input from the user to the new prototype text character and/or the averaged prototype text character.

The text processor 340 maps the user's input to the identified text character and the identified prototype text character. For example, the drawing of the letter "Z" input by the user is appended with an image of a keyboard version of the letter "Z" and a prototype letter "Z" that the user has drawn in the past.

A shape processor 350 is connected to the symbol processor 340, wherein the shape processor 350 matches the input to one or more prototype shapes in the database if the input does not represent a text character. For example, the user draws an arrow on the interface 310; and, the shape processor 350 identifies an arrow stored in the database 320 that the user has drawn in the past.

In at least one embodiment, the shape processor 350 stores at least one prototype shape for each shape in the database 320, wherein the prototype shape includes a threshold degree of similarity with the shape. Thus, in one embodiment, the shape processor 350 stores the input as a new prototype shape. In another embodiment, the shape processor 350 averages the input with one or more prototype shapes to create an averaged prototype shape. The shape processor 350 compares future input from the user to the new prototype shape and/or the averaged prototype shape.

Once the shape is prototype shape is identified, the shape processor 350 maps the input to the prototype shape. For example, the arrow drawn by the user is tagged with an image file of an arrow drawn by the user in the past.

In at least one embodiment of the invention, the shape processor 350 also identifies a standard shape represented by the input and maps the input to the standard shape. For example, the user draws a smiley face on the interface 310 the shape processor 350 identifies a standard smiley face shape or symbol from a word processing application, and maps the standard smiley face to the drawn smiley face.

In at least one embodiment, the system 300 includes a display for displaying the input, the identified text character, and the identified prototype text character and/or the input and the prototype shape. In one embodiment, the interface 310 is also the display (e.g., touchscreen display on a smart phone).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
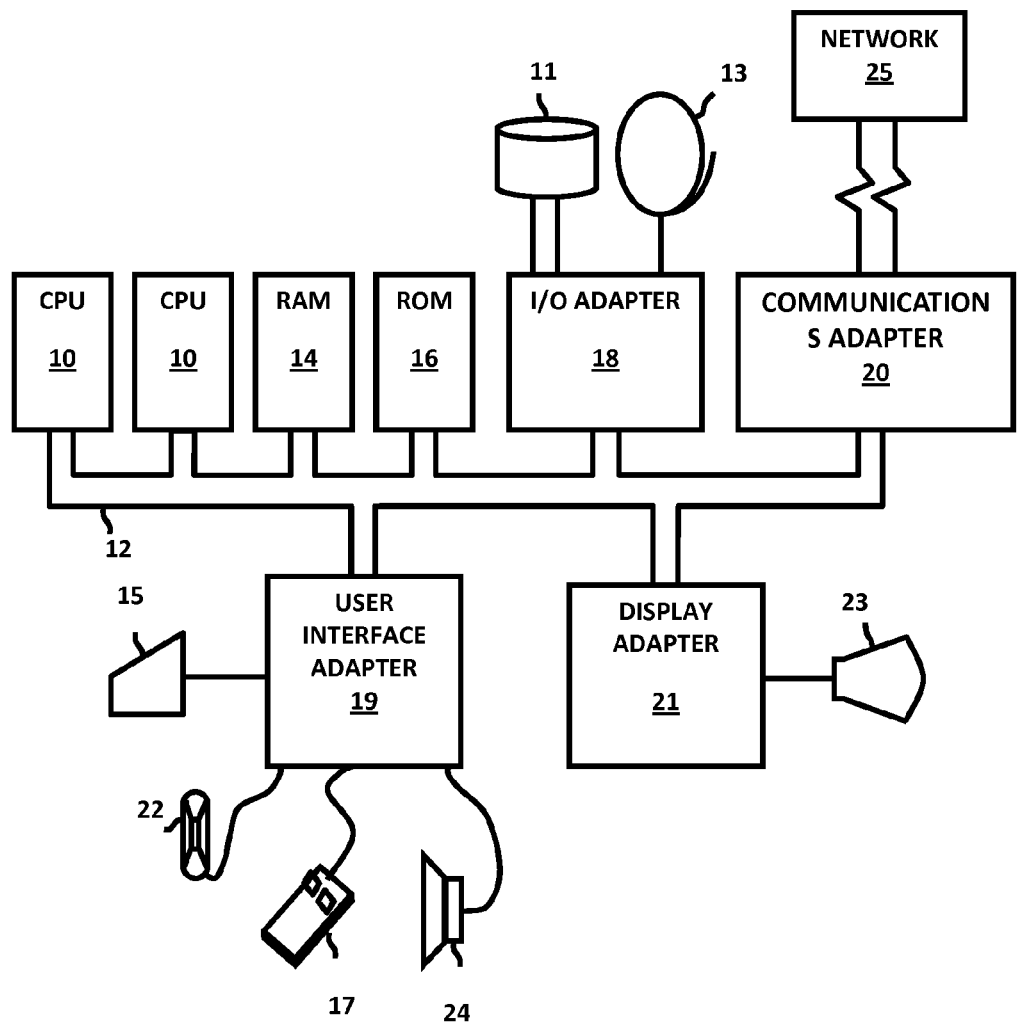
FIG. 4 illustrates a computer program product according to an embodiment of the invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for handwriting recognition on an electronic device, the method comprising:
    receiving input from a user on an interface of the electronic device, the input including at least one handwritten symbol;
    comparing the input to prototype symbols stored in a database to determine whether the input includes a threshold degree of similarity with at least one of the prototype symbols;
    storing the input as a prototype symbol if the input does not include a threshold degree of similarity with at least one of the prototype symbols;
    determining whether the input represents a text character if the input includes a threshold degree of similarity with at least one of the prototype symbols;
    if the input represents a text character:
        identifying the text character,
        identifying at least one prototype text character in the database based on the identified text character, and
        mapping the input to the identified text character and the identified prototype text character; and
    if the input does not represent a text character:

matching the input to at least one prototype shape in the database, and mapping the input to the prototype shape.

2. The method according to claim 1, further comprising, if the input does not represent a text character, identifying a standard shape represented by the input and mapping the input to the standard shape.

3. The method according to claim 1, further comprising:

storing at least one prototype text character for each text character in the database, the at least one prototype text character including a threshold degree of similarity with the text character; and storing at least one prototype shape for each shape in the database, the at least one prototype shape including a threshold degree of similarity with the standard shape.

4. The method according to claim 1, further comprising at least one of:

displaying the input, the identified text character, and the identified prototype text character on the interface; and displaying the input and the prototype shape on the interface.

5. The method according to claim 1, further comprising storing the input as at least one of a new prototype text character and a new prototype shape.

6. The method according to claim 5, wherein the storing of the input as at least one of the new prototype text character and the new prototype shape comprises at least one of:

replacing an old prototype text character with the new prototype text character, and replacing an old prototype shape with the new prototype shape.

7. The method according to claim 5, further comprising comparing a future input from the user to at least one of the new prototype text character and the new prototype shape.

8. The method according to claim 1, further comprising at least one of:

averaging the input with the at least one prototype text character to create an averaged prototype text character; and averaging the input with the at least one prototype shape to create an averaged prototype shape.

9. A method for handwriting recognition on an electronic device, the method comprising:

receiving input from a user on an interface of the electronic device, the input including at least one handwritten symbol;

comparing the input to prototype symbols stored in a database to determine whether the input includes a threshold degree of similarity with at least one of the prototype symbols;

storing the input as a prototype symbol if the input does not include a threshold degree of similarity with at least one of the prototype symbols;

determining whether the input represents a text character if the input includes a threshold degree of similarity with at least one of the prototype symbols;

if the input represents a text character:

identifying the text character, identifying at least one prototype text character in the database based on the identified text character, mapping the input to the identified text character and the identified prototype text character, and displaying the input, the identified text character, and the identified prototype text character on the interface; and if the input does not represent a text character:

identifying a standard shape represented by the input, identifying at least one prototype shape in the database based on the identified standard shape, mapping the input to the standard shape and the prototype shape, and displaying the input, the standard shape, and the prototype shape on the interface.

10. The method according to claim 9, further comprising:

storing at least one prototype text character for each text character in the database, the at least one prototype text character including a threshold degree of similarity with the text character; and storing at least one prototype shape for each shape in the database, the at least one prototype shape including a threshold degree of similarity with the standard shape.

11. The method according to claim 9, further comprising storing the input as at least one of a new prototype text character and a new prototype shape.

12. The method according to claim 11, wherein the storing of the input as at least one of the new prototype text character and the new prototype shape comprises at least one of:

replacing an old text prototype text character with the new prototype text character, and replacing an old prototype shape with the new prototype shape.

13. The method according to claim 11, further comprising comparing a future input from the user to at least one of the new prototype text character and the new prototype shape.

14. The method according to claim 9, further comprising at least one of:

averaging the input with the at least one prototype text character to create an averaged prototype text character; and averaging the input with the at least one prototype shape to create an averaged prototype shape.

15. A system for handwriting recognition, said system comprising:

an interface for receiving input from a user, the input including at least one handwritten symbol;

a database connected to said interface, said database including prototype symbols;

a symbol processor connected to said database, said symbol processor compares the input to the prototype symbols stored in said database to determine whether the input includes a threshold degree of similarity with at least one of the prototype symbols, and determines whether the input represents a text character;

a text processor connected to said symbol processor, said text processor identifies the text character if the input represents a text character, identifies at least one prototype text character in said database based on the identified text character, and maps the input to the identified text character and the identified prototype text character; and a shape processor connected to said symbol processor, said shape processor matches the input to at least one prototype shape in said database if the input does not represent a text character, and maps the input to the prototype shape.

16. The system according to claim 15, wherein said shape processor identifies a standard shape represented by the input and maps the input to the standard shape.

17. The system according to claim 15, wherein said text processor stores at least one prototype text character for each text character in said database, the at least one prototype text character including a threshold degree of similarity with the text character, and wherein said shape processor stores at least one prototype shape for each shape in said database, the at least one prototype shape including a threshold degree of similarity with the standard shape.

18. The system according to claim 15, further comprising a display for displaying at least one of:

the input, the identified text character, and the identified prototype text character; and the input and the prototype shape.

19. The system according to claim 15, wherein said text processor stores the input as a new prototype text character.

20. The system according to claim 19, wherein said text processor compares a future input from the user to the new prototype text character.

21. The system according to claim 15, wherein said shape processor stores the input as a new prototype shape.

22. The system according to claim 21, wherein said shape processor compares a future input from the user to the new prototype shape.

23. The system according to claim 15, wherein said text processor averages the input with the at least one prototype text character to create an averaged prototype text character.

24. The system according to claim 15, wherein said shape processor averages the input with the at least one prototype shape to create an averaged prototype shape.

25. A computer program product for a dynamic transporting pool, the computer program product comprising:

a non-transitory computer readable storage medium;

first program instructions to receive input from a user on an interface of the electronic device, the input including at least one handwritten symbol;

second program instructions to compare the input to prototype symbols stored in a database to determine whether the input includes a threshold degree of similarity with at least one of the prototype symbols;

third program instructions to store the input as a prototype symbol if the input does not include a threshold degree of similarity with at least one of the prototype symbols;

fourth program instructions to determine whether the input represents a text character if the input includes a threshold degree of similarity with at least one of the prototype symbols;

fifth program instructions to, if the input represents a text character: identify the text character, identify at least one prototype text character in the database based on the identified text character, and map the input to the identified text character and the identified prototype text character first program instructions to; and sixth program instructions to, if the input does not represent a text character: match the input to at least one prototype shape in the database, and map the input to the prototype shape, the first program instructions, the second program instructions, the third program instructions, the fourth program instructions, the fifth program instructions, and the sixth program instructions are stored on the non-transitory computer readable storage medium.

* * * * *